Figure 1:
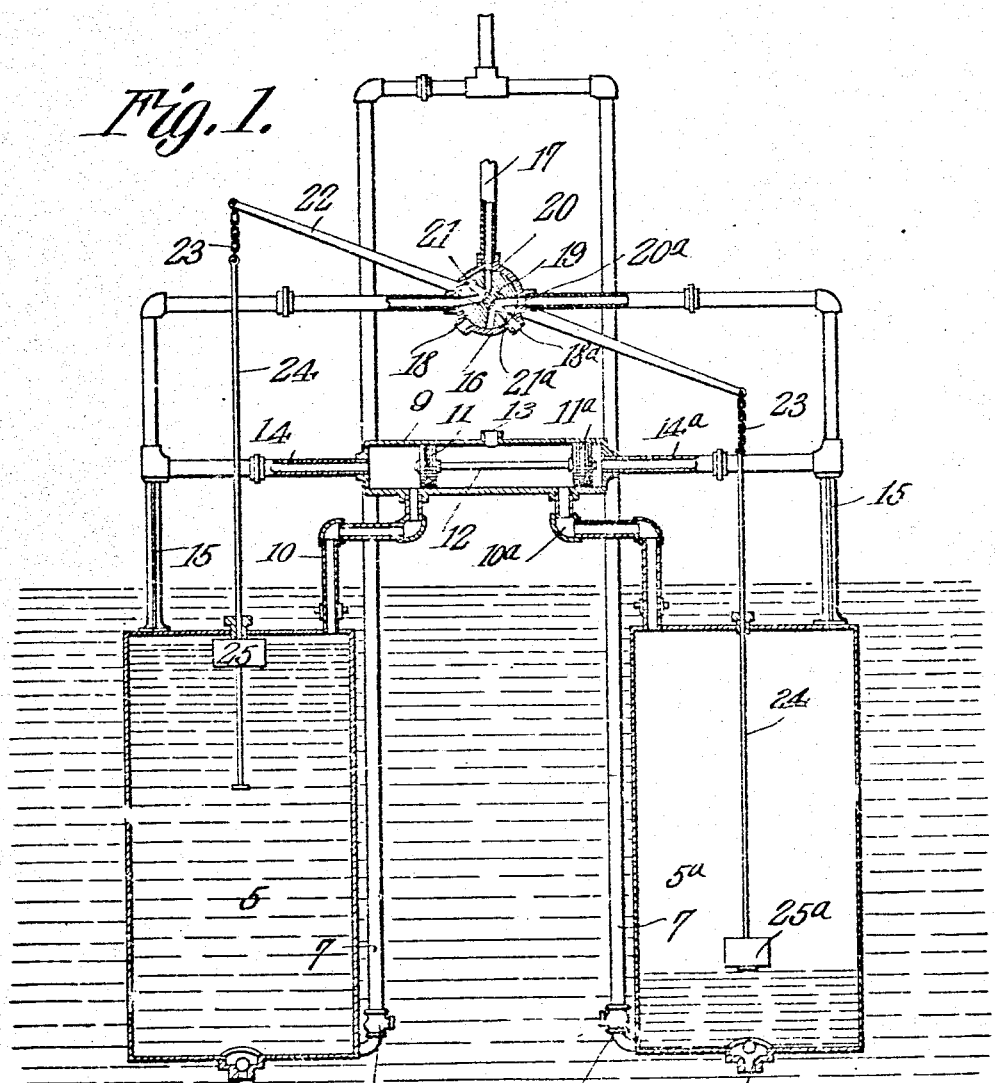

J. L. WRAY.
WATER ELEVATOR.
APPLICATION FILED MAY 3, 1909.

955,301. Patented Apr. 19, 1910.

Inventor
James L. Wray.

Witnesses

By C. A. Snow & Co.
Attorneys

UNITED STATES PATENT OFFICE.

JAMES L. WRAY, OF KEWANEE, ILLINOIS.

WATER-ELEVATOR.

955,301.                    Specification of Letters Patent.      Patented Apr. 19, 1910.

Application filed May 3, 1909.  Serial No. 493,618.

To all whom it may concern:

Be it known that I, JAMES L. WRAY, a citizen of the United States, residing at Kewanee, in the county of Henry and State of Illinois, have invented a new and useful Water-Elevator, of which the following is a specification.

This invention relates to that class of water elevating apparatus characterized by a pair of submerged, or partly submerged tanks, into which the water flows, and from which it is alternately discharged by compressed air, the air acting as a piston to drive the water to its destination, and the entry of the air into the tanks being governed by a float-controlled valve mechanism.

The object of the present invention is to simplify the apparatus, and to render the same more efficient in operation, and also to provide an improved form of valve mechanism by which a waste of air is effectually prevented.

With the foregoing objects in view, the invention consists in a novel construction and arrangement of parts to be hereinafter described and claimed, reference being had to the drawing hereto annexed forming a part of this specification, in which—

Figure 2:
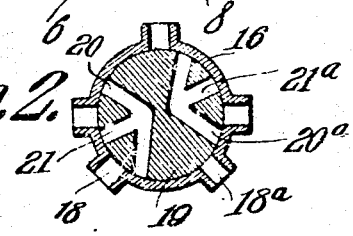
Figure 3:

Figure 1 is a vertical sectional view of the apparatus. Figs. 2 and 3 are sectional details of the valve hereinafter described, showing the same in different positions.

In the drawings, 5 and 5ª indicate a pair of tanks in which the pressure of the air is brought to bear on the water, the air acting as a piston to drive the water. The tanks are submerged, or partly submerged, in the water to be elevated, and the latter enters the tanks through inlets in the bottom thereof, said inlets being controlled by inwardly opening check valves 6 and 6ª. From each tank leads a discharge pipe 7 which carries the water to its destination. The discharge pipes communicate with the tanks close to the bottom thereof, and are provided each with a check valve 8.

At 9 is indicated an air cylinder which is located outside the tanks, and is in communication therewith, a pipe 10 leading from the cylinder to the tank 5 and a pipe 10ª to the tank 5ª. In the cylinder 9 works a pair of pistons 11 and 11ª which are connected by a stem 12 so as to move in unison. Between these pistons the cylinder is provided with an exhaust port 13. Compressed air is supplied to the cylinder from a suitable source by a pipe 14 entering one end of the cylinder, and a pipe 14ª entering the opposite end thereof. These pipes are supported by standards 15 rising from the tanks, and by which a support for the cylinder 9 is also had.

The pipes 14 and 14ª lead to a multiple-valve casing 16 to which is also connected a pipe 17 leading to the source of supply. This pipe 17 enters the valve casing at a point midway between the points of entry of the pipes 14 and 14ª, and on the opposite side of the valve casing, equidistant from the points of entry of said pipes 14 and 14ª, are outlet ports 18 and 18ª to the atmosphere.

The casing 16 contains a rotary valve 19 having on one side a passage 20 and an intermediate passage 21, and on the other side a passage 20ª and an intermediate passage 21ª. The purpose of this arrangement of passages will be understood from the following description of the operation of the apparatus.

Fig. 1 of the drawings shows the position of the various parts when the air is passing into the tank 5, and exhausting from the tank 5ª. The passage 20 of the valve 19 establishes communication between the pipe 17 and the pipe 14, and the air therefore enters that end of the cylinder 9 to which said pipe 14 is connected, and flows through the pipe 10 into the tank 5. The pressure of the air on the contents of the tank forces the same out of the tank through the pipe 7, the check valve 6 closing. The tank 5ª is empty, the air exhausting through the pipe 10ª, into the space between the pistons 11 and 11ª, and out of the port 13 to the atmosphere. The end of the cylinder 9 which is entered by the pipe 14ª is also open to the atmosphere through the pipe 14ª and passages 20ª and 21ª. By thus opening the space between the piston 11ª and the adjacent end of the cylinder 9 to the atmosphere, the pressure in said space is enabled to escape, and is therefore not retained in the cylinder to oppose the movement of the piston 11 as it travels in this direction at the beginning of the herein-described operation, in order to establish communication between the cylinder 9 and the tank 5. The valve 19 is operated by a lever 22 to each end of which is connected by means of a chain or other suitable flexible connection 23 a rod 24. One of these rods extends into the tank 5, and the other rod into the tank 5ª. On the rod within the tank 5 is mounted a float 25, and on the rod within the tank 5ª is mounted a float 25ª, by means of which the lever 22 is swung in an obvious manner to reverse the position of the valve 19 as the levels of the water in the tanks drop. As the tank 5 empties, the float 25 lowers, and pulls that end of the lever 22 to which its rod 24 is connected downwardly, whereupon the position of the valve 19 is reversed, so that the position of the pistons 11 and 11ª is reversed. With the said valve in reversed position, air enters the tank 5ª and exhausts from the tank 5, whereupon the water is forced out of the tank 5ª, and it enters the tank 5.

The mechanism herein described is devoid of complicated parts to get out of order, and it is therefore reliable in operation. The valve 19 is designed so as to cut off the air supply before the tank to which the air is flowing is entirely emptied, whereby a great saving of air is effected.

The air flowing to the tank 5 is cut off as soon as the passage 20 clears the inlet port of the valve casing 16, and thereafter, and until the position of the valve is entirely reversed, the air in said tank operates expansively to expel the water therefrom. This will be evident from an inspection of Fig. 2 which shows the intermediate position of the valve. During this position of the valve, the exhaust from the tank 5ª is not cut off, but takes place through the pipe 10ª, cylinder 12, and port 13.

What is claimed is:

1. In a water elevator, a pair of tanks having inlets and outlets, a fluid pressure cylinder connected to a source of supply, and communicating with the tanks, a valve working in the cylinder, and alternately establishing communication between the cylinder and the tanks, a valve controlling the flow to the cylinder and having its passages arranged to cut off the fluid pressure supply to the cylinder before the tank which is in communication therewith is emptied, the course of the fluid pressure in its travel to the tanks being through the last mentioned valve and the cylinder, and float-controlled means for operating the last mentioned valve.

2. In a water elevator, a pair of tanks having inlets and outlets, a fluid pressure cylinder, said cylinder having ports communicating with the tanks, and an exhaust port between said ports, a pair of connected pistons working in the cylinder, and alternately opening one of the tanks to the space in the cylinder in front of one of the pistons, and the other tank to the space between the pistons, the exhaust port being located between said pistons, fluid pressure supply pipes entering opposite ends of the cylinder, a multiple-way valve to which said pipes are connected, said valve opening one end of the cylinder to the fluid pressure supply, and the other end to the atmosphere, the course of the fluid pressure in its travel to the tanks being through the last mentioned valve and the cylinder, and float-controlled means for operating the valve.

3. In a water elevator, a pair of tanks having inlets and outlets, a fluid pressure cylinder, said cylinder having ports communicating with the tanks, and an exhaust port between said ports, a pair of connected pistons working in the cylinder, and alternately opening one of the tanks to the space in the cylinder in front of one of the pistons, and the other tank to the space between the pistons, the exhaust port being located between said pistons, fluid pressure supply pipes entering opposite ends of the cylinder, a multiple-way valve to which said pipes are connected, said valve alternately opening one end of the cylinder to the fluid pressure supply and the other end to the atmosphere, and having its ports arranged to cut off the fluid pressure supply to the cylinder before the tank which is in communication therewith empties, the course of the fluid pressure in its travel to the tanks being through the last mentioned valve and the cylinder, and float-controlled means for operating the valve.

4. In a water elevator, a pair of tanks having inlets and outlets, a fluid pressure cylinder, said cylinder having ports communicating with the tank, and an exhaust port between said ports, a pair of connected pistons working in the cylinder, and alternately opening one of the tanks to the space in the cylinder in front of one of the pistons, and the other tank to the space between the pistons, the exhaust port being located between said pistons, fluid pressure supply pipes entering opposite ends of the cylinder, a three-way valve to which said pipes are connected, said valve alternately opening one end of the cylinder to the fluid pressure supply, and said valve having outlets to the atmosphere, and intermediate ports alternately communicating therewith to open the ends of the cylinder to the atmosphere, the course of the fluid pressure in its travel to the tanks being through the last mentioned valve and the cylinder, and float controlled means for operating the valve.

In testimony that I claim the foregoing as my own, I have hereto affixed my signature in the presence of two witnesses.

JAMES L. WRAY.

Witnesses:
J. A. CLARK,
H. N. HEFLIN.